US008626001B2

(12) United States Patent
Kamakura et al.

(10) Patent No.: US 8,626,001 B2
(45) Date of Patent: Jan. 7, 2014

(54) OPTICAL COMMUNICATION CARD AND OPTICAL TRANSMISSION DEVICE

(75) Inventors: Masafumi Kamakura, Yokohama (JP); Koji Takatori, Tokyo (JP); Yasuyuki Fukashiro, Yokohama (JP); Tetsuya Uda, Yokohama (JP); Hidemasa Narita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 13/243,982

(22) Filed: Sep. 23, 2011

(65) Prior Publication Data

US 2012/0099871 A1   Apr. 26, 2012

(30) Foreign Application Priority Data

Oct. 22, 2010   (JP) .................................. 2010-236977

(51) Int. Cl.
*H04B 10/00*   (2013.01)

(52) U.S. Cl.
USPC .......................................... 398/208; 398/159

(58) Field of Classification Search
USPC ......................................... 398/158–161, 208
See application file for complete search history.

(56) References Cited

U.S. PATENT DOCUMENTS

| | | | | |
|---|---|---|---|---|
| 4,047,151 A * | 9/1977 | Rydbeck et al. | .............. | 714/774 |
| 5,856,988 A * | 1/1999 | Kiriyama | ...................... | 714/774 |
| 6,044,485 A * | 3/2000 | Dent et al. | ..................... | 714/774 |
| 6,182,264 B1 * | 1/2001 | Ott | ................... | 714/774 |
| 6,205,187 B1 * | 3/2001 | Westfall | ......................... | 375/341 |
| 6,314,535 B1 * | 11/2001 | Morris et al. | ................... | 714/708 |
| 6,400,728 B1 * | 6/2002 | Ott | ............................. | 370/465 |
| 6,530,055 B1 * | 3/2003 | Fukunaga | ..................... | 714/746 |
| 6,735,735 B1 * | 5/2004 | Ohira et al. | .................... | 714/776 |
| 6,871,314 B2 * | 3/2005 | Ohira et al. | .................... | 714/776 |
| 7,035,552 B2 * | 4/2006 | Hayashi et al. | ............... | 398/192 |
| 7,046,935 B1 * | 5/2006 | Fang et al. | ..................... | 398/147 |
| 7,062,165 B2 * | 6/2006 | Brissette et al. | ................ | 398/27 |
| 7,133,934 B1 * | 11/2006 | Rossello et al. | ............. | 709/249 |
| 7,155,538 B1 * | 12/2006 | Rossello et al. | ............. | 709/249 |
| 7,228,454 B2 * | 6/2007 | Cho et al. | ......................... | 714/13 |
| 7,257,764 B2 * | 8/2007 | Suzuki et al. | ................. | 714/774 |
| 7,443,785 B2 * | 10/2008 | Bloebaum | ..................... | 370/216 |
| 7,515,831 B2 * | 4/2009 | Lee et al. | ...................... | 398/135 |
| 7,734,191 B1 * | 6/2010 | Welch et al. | ................... | 398/192 |
| 7,907,070 B2 * | 3/2011 | Wu et al. | ......................... | 341/60 |
| 8,270,419 B2 * | 9/2012 | Liva et al. | ..................... | 370/401 |
| RE43,836 E * | 11/2012 | Morris et al. | ................. | 714/708 |
| 2003/0156840 A1 * | 8/2003 | Uchikata | ........................... | 398/7 |
| 2004/0131368 A1 * | 7/2004 | Sawada et al. | ................ | 398/202 |
| 2005/0041972 A1 * | 2/2005 | Kim et al. | ....................... | 398/78 |
| 2005/0249211 A1 * | 11/2005 | Chou et al. | .................... | 370/389 |
| 2006/0029065 A1 * | 2/2006 | Fellman | ....................... | 370/389 |
| 2008/0145064 A1 * | 6/2008 | Ohira et al. | .................... | 398/162 |

(Continued)

FOREIGN PATENT DOCUMENTS

JP   2010-118896   5/2010

*Primary Examiner* — Agustin Bello (74) *Attorney, Agent, or Firm* — Foley & Lardner LLP (57) ABSTRACT

There arises a problem that power consumption increases along with an increasing throughout of an FEC function effective in speeding up of a transmission speed. FEC function information necessary for a system is prepared, and multiple FEC functions are properly used according to a selected transmission line, etc.

5 Claims, 8 Drawing Sheets

(56) References Cited

U.S. PATENT DOCUMENTS

| | | | |
|---|---|---|---|
| 2009/0154941 A1* | 6/2009 | Mateosky et al. | 398/208 |
| 2010/0021158 A1* | 1/2010 | Kanno et al. | 398/27 |
| 2010/0202334 A1* | 8/2010 | Soliman et al. | 370/311 |
| 2010/0296811 A1* | 11/2010 | Ohira et al. | 398/72 |
| 2011/0176812 A1* | 7/2011 | Kamakura et al. | 398/115 |
| 2012/0099871 A1* | 4/2012 | Kamakura et al. | 398/135 |

\* cited by examiner

OPTICAL COMMUNICATION CARD AND OPTICAL TRANSMISSION DEVICE

INCORPORATION BY REFERENCE

The present application claims priority from Japanese application JP2010-236977 filed on Oct. 22, 2010, the content of which is hereby incorporated by reference into this application.

BACKGROUND OF THE INVENTION

The present invention relates to an optical communication card comprising a forward error correction (FEC) function and to an optical transmission device.

Along with the recent popularization of an optical communication technology in various fields such as the Internet (registered trademark) and optical phones, various technologies to realize a long distance transmission and a large-capacity transmission have been developed in an optical transmission system.

As to the long distance transmission, in general, as a propagation distance becomes longer, a data error in a signal propagation due to an influence of a propagation loss in an optical fiber becomes more prominent. Therefore, an error correction function called an FEC function is effective. The FEC is a technology that correction bits necessary for a data correction are inserted into data to be transmitted on a transmission side, an error detection is performed based on the correction bit on a reception side, and when an error is detected, the data is corrected. Even if a data error occurs, the data correction is possible on the reception side without retransmitting data. Retransmission of data is prevented, and speeding up of the data is possible. At present, several types of FECs are widely used, and a generic FEC (GFEC) using an RS [255, 239] code standardized by ITU-T G.709 and an enhanced FEC (GFEC) standardized by ITU-T G.975.1 are typically used By using various codes such as a BCH [3860, 3824] code and an RS [1023, 1007] code gong the EFECs, multiple types of FECs can be realized.

As compared with the conventional GFEC, the EFEC has excellent error correction capability and can suppress an increase in a bit error rate along with an increase in transmission capacity. The conventional GFEC can correct an error up to approximately an error rate of $10^{-5}$, and on the other hand, the EFEC can correct an error up to approximately an error rate of $10^{-3}$ by performing Concatenated Coding. Here, the error rate represents a percentage of the number of occurring error bits per one hundred thousand bits of transmitted data. The error rate after the error correction in the correctable range of the GFEC and the EFEC is generally an error rate of $10^{-12}$ or less requested for a high-speed signal such as fiber channel signal. Note that since the EFEC performs two or more times of error correction calculations, power consumption also increases as a throughput of information increases.

JP-A-2010-118896 discloses a method for suppressing power consumption. JP-A-2010-118896, the number of bit errors of a main signal propagating on an optical transmission line is always monitored, and when the number of bit errors is smaller than the set threshold, an FEC function is not used. Then, the FEC function is necessary when a bit error increases during practical operation, and it is operated. This process permits power consumption of the unnecessary FEC function during practical operation to be reduced.

On the other hand, as to a large capacity, by the multiplexing technology such as me-division multiplexing or wavelength-division multiplexing, an optical transmission system having the transmission capacity of 40 Gbit/s (hereinafter, referred to as "bps") or 100 Gbps has been developed, recently.

Further, as a technology of performing a path selection by an optical transmission device, there are an optical switching technology of switching large capacity optical signals and a packet switching technology of switching large capacity optical signals on a packet basis. Note that in a current practical technology, when performing a packet switching, it is necessary to convert an optical signal into an electrical signal, to read destination information on each packet basis and to perform the packet switching. Therefore, it is also necessary to speed up a transmission speed of electrical signals in the device. As the transmission speed of electrical signals used in the current packet switching technology, 1 Gbps or 3.125 Gbps is the mainstream. Also, a packet switching element for 6.25 Gbps or up to 11.1 Gbps is currently developed. Since, when an electrical signal propagates through the device, propagation loss is caused by a substrate or connectors, etc., it is necessary to design considering propagation loss and the transmission speed. At present, the standard "10GBASE-KR" in which a backplane (hereinafter, referred to as "BP") transmission of 10 Gbps is assumed in IEEE802.3ap is standardized including the FEC function, and the standard makes it possible to correct the data error possibly occurring due to the propagation loss and to speed up transmission speed of electrical signals.

SUMMARY OF THE INVENTION

It is considered to realize, by performing a BP transmission of 10 Gbps using an FEC function, an optical transmission device mounted with a large-capacity switching function having high transmission quality. On the other hand, as to the large capacity, increasing signal processing operation because of adding the FEC function further increases power consumption, in addition to increasing signal processing operation because of a high-speed signal. When the FEC function is not used, power consumption can be reduced over the entire device. Since the transmission quality of a communication network exerts an influence on quality of communication service, it has to be most emphasized. In general, with respect to the main signal of data communication over a network, reliability is emphasized and the FEC function is used to secure the transmission quality in many cases. However, the propagation loss is practically different depending on the transmission speed or each transmission line in the device. Therefore, for example, in a transmission line which is low speed or has small attenuation, the FEC function may be unnecessary. By using the FEC function also for such a transmission line which needs little FEC function, power consumption increases more than necessary.

In an FEC function control method disclosed in JP-A-2010-118896, electrical power saving can be realized to some extent. However, since the number of bit errors of the main signal during practical operation is monitored on the decoder side, the FEC function cannot be validated before a bit error occurs. In short, there arises a problem of the maintenance of reliability as the optical transmission device.

As described above, optical communication having a forward error correction (FEC) function needs a technology for definitely suppressing power consumption due to the use of the FEC function while reducing a rate of the bit error occurrence over a network.

According to an aspect of the invention, an optical transmission device comprising: multiple optical communication cards, a control card that controls the optical communication cards; and a switch card connected to the multiple optical communication cards, wherein the optical communication card comprises: a signal transmission/reception unit that performs optical-electrical signal conversion for a signal received from outside; a first FEC processing unit that performs FEC processing for a signal from the signal transmission/reception unit; a first function selection unit that selects a type of the FEC processing and controls the first FEC processing unit; and a first control unit that transmits/receives a signal to/from the control card, the switch card comprises, a second FEC processing unit that performs FEC processing for a signal from the optical communication card; and a second control unit that selects a type of the FEC processing and controls the second FEC processing unit and that transmits/receives a signal to/from the control card, and the control card comprises, a data table that associates a transmission line with multiple different types of FEC functions applicable to the transmission line and that stores them; and a retrieval processing unit that retrieves information to be transmitted to at least any one of the first and second control units from the data table.

In a main signal transmission in the device, a transmission speed and a bit error rate of each transmission line in the device may also be here grasped before practical operation by being computed from a signal attenuation amount of a design parameter such as a substrate material, a transmission line length, and a connector. For example, when an error rate after the FEC correction is required to be $10^{-15}$ or less as a system design value, the following FEC function may be selected from among multiple FEC functions so that an error rate after the FEC correction becomes $10^{-15}$ or less with respect to each transmission speed and transmission line: if an error rate is $10^{-15}$ or less, an FEC function OFF, if the error rate is in the range of $10^{-15}$ to $10^{-12}$, a first FEC function of which a correction processing operation is little and which reduces the error rate of the above range to $10^{-15}$ after the FEC correction, if the error rate is in the range of $10^{-12}$ to $10^{-5}$, a second FEC function of which a correction processing operation is more than that of the first FEC function and which reduces the error rate of the above range to $10^{-15}$ after the FEC correction; and further, if the error rate is in the range of $10^{-5}$ to $10^{-3}$, a third FEC function of which a correction processing operation is more than that of the second FEC function and which reduces the error rate of the above range to $10^{-15}$ after the FEC correction.

A data table as a database for selecting the FEC function may be designed so as to be held in the control card or in some or all of the control units of the optical communication cards, or in both of them, and/or to be held in the external terminal used by a maintenance person when setting the device.

According to the present invention, power consumption of the FEC function in the device can be reduced while keeping transmission quality of the main signal in the device necessary for system requirements.

Other objects, features and advantages of the invention will become apparent from the following description of the embodiments of the invention taken in conjunction with the accompanying drawings.

DESCRIPTION OF THE EMBODIMENTS

An optical transmission system using the present invention will be described below. Note that the present invention should not be limited by the embodiment described below.

Figure 1:
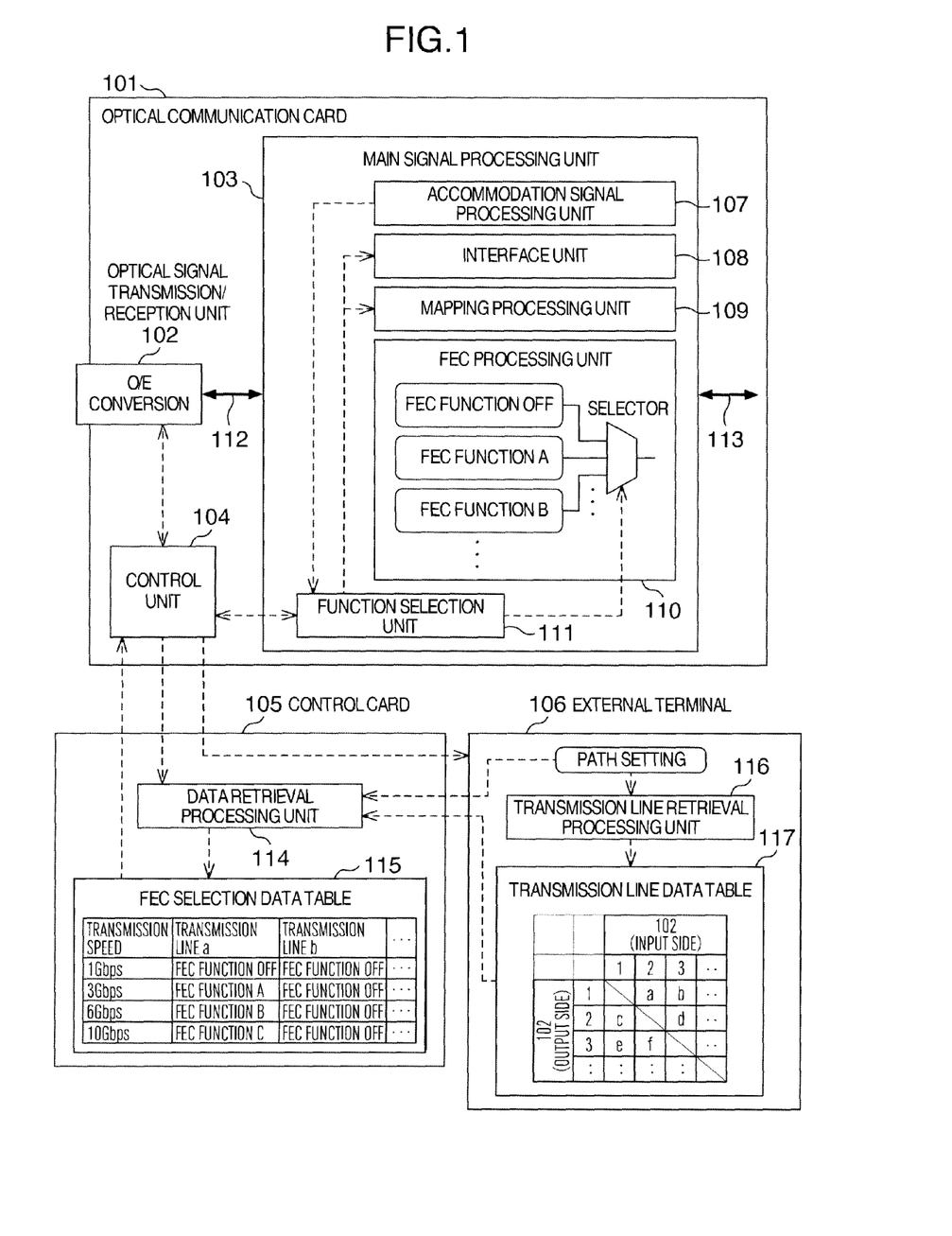
FIG. 1 illustrates an optical communication card focusing on a configuration of a main signal processing unit.

FIG. 1 illustrates a configuration of the optical communication card, control card and external terminal according to the present embodiment focusing on a configuration of a main signal processing unit of the optical communication card. Here, the optical transmission device is mounted with one or more optical communication cards and the control card capable of controlling the cards in the device.

The optical communication card 101 in FIG. 1 comprises a main signal processing unit 103 including a selection function about multiple types of FEC functions. The optical communication card 101 illustrated in FIG. 1 transmits/receives a main signal transmitted over a network outside the device. The optical communication card 101 comprises multiple optical signal transmission/reception units 102 that perform optical-electrical signal conversion, and each optical signal transmission/reception unit 102 internally has a transmission unit and a reception unit. Further, the optical communication card 101 comprises optical communication card main signal processing units 103 corresponding to an optical signal transmission/reception units 102, respectively. In FIG. 1, only one optical signal transmission/reception unit 102 and one optical communication card main signal processing unit 103 corresponding thereto are described.

The main signal processing unit 103 has an accommodation signal processing unit 107 monitors a main signal accommodated from outside the device, an interface unit 108 for transmitting a main signal to other cards in the device, a mapping processing unit 109 that can convert multiple protocols, and an FEC processing unit 110 that can select an FEC function OFF or multiple types of FEC functions (for example, that can set an RS [255, 239] code FEC as an FEC function A, a BCH [3860, 3824] code FEC as an FEC function B), insert data correction bit, and process an error detection/correction, and further a function selection unit 111 that can select different types of functions of each unit 107 to 110 in the main signal processing unit 103. Further, the optical communication card 101 comprises a control unit 104 that controls each function unit, and the control unit 104 performs, by control signals, processing instruction and alarm/monitoring, etc, of each function unit.

A maintenance person can determine and confirm communication service contents such as transmission speeds and path settings of transmission lines, etc, in the device from the external terminal 106. Information from the external terminal 106 is input to the control unit 104 via the control card 105 that performs control of one or more optical communication cards mounted on the device or alarm/monitoring. Further, the control unit 104 transmits control signals to each function unit so as to realize communication service contents.

As described above, the FEC processing unit 110 internally has multiple types of FEC functions. Based on the selected FEC function, the unit 110 detects error from a main signal with correction bits of received signals to correct it, and inserts the correction bits into signals to be transmitted. This process permits the FEC processing unit 110 to select and process an appropriate FEC function based on the control signals from the control unit 104. Here, the multiple types of FEC functions mean multiple FEC functions having different error correction capabilities and throughputs (i.e., power consumption) such as a first FEC function which can perform an error correction up to a constant error rate, and a second FEC function of which a throughput is more than that of the first FEC function and which can perform an error correction up to an error rate higher than that of the first FEC function. Further, the FEC processing unit 110 also has an FEC function OFF that can be used in the case where an FEC processing function is not performed at all and an error is allowed.

Relating to a main signal transmission in the device, a transmission speed and a bit error rate of each transmission line in the device can also be here grasped before practical operation by being computed from a signal attenuation amount of a design parameter such as a substrate material, a transmission line length, and a connector, etc. In this case, by preparing a data table in which a bit error rate is previously grasped and an appropriate FEC function is selected in each transmission speed and transmission line and performing a path setting from the external terminal 106, the FEC function can be selected. The appropriate FEC function means an FEC function that adapts to the error rate and reduces an error rate after the error correction to a system requirement value or less. For example, when an error rate after the FEC correction is required to be $10^{-15}$ or less as the system design value, the following FEC function is selected with respect to each transmission speed and transmission line: if the error rate is allowable $10^{-15}$ or less, the FEC function OFF; if the error rate is in the range of $10^{-15}$ to $10^{-12}$, the FEC function A that reduces the error rate of the above range to $10^{-15}$ after the FEC correction; if the error rate is in the range of $10^{-12}$ to $10^{-5}$, the FEC function B that reduces the error rate of the above range to $10^{-15}$ after the FEC correction, and if the error rate is in the range of $10^{-5}$ to $10^{-3}$, the FEC function C that reduces the error rate of the above range to $10^{-15}$ after the FEC correction. An error correction throughput increases in the order of the FEC functions A, B, and C, and although the error correction capability increases, power consumption also increases at the same time.

Further, the path setting means a setting performed in order to transmit a main signal propagating at an arbitrary transmission speed over a network from one certain optical signal transmission/reception unit (hereinafter, referred to as a "port") to another port. In the device, a transmission line is connected via physical wiring or LSI to each path, and propagation characteristics are different in each transmission line. Therefore, a FEC function is selected from among multiple FEC functions so that an error rate after the FEC correction becomes $10^{-15}$ or less with respect to each transmission line steadily.

For example, it is assumed that there are two different transmission lines "a" and "b" in the device. In the control card 105 of FIG. 1, in each transmission line (and in each transmission speed), the FEC functions to be selected based on the previously-grasped error rate are stored as an FEC selection data table 115. Based on the transmission speed and transmission line information input to the data retrieval processing unit 114, the FEC function is selected from the above-described table 115. For example, as in the transmission line "a", if the error rate increases more as the transmission speed becomes higher, then the FEC function is set in the FEC selection data table 115 so as to secure the error rate of $10^{-15}$ by using any one of the FEC functions A, B, and C to perform an error correction according to the increasing error rate. For example, as in the transmission line "b", if the previously-grasped error rate $10^{-15}$ can be secured in each transmission speed, then the FEC function OFF is uniformly set because the error is allowable.

A maintenance person can also input the transmission speed and transmission line info ion necessary for the data retrieval by performing the path setting from the external terminal 106. By the path setting, the input transmission speed information is directly sent to the data retrieval processing unit 114. As to the transmission line information, a transmission line retrieval unit 116 in the external terminal 106 selects a physical transmission line in the device from a transmission line data table 117 including database on each transmission line between ports of the device. The selected transmission line information is sent to the data retrieval processing unit 114 of the control card 105. Further, the FEC function for a transmission line to be set in the device is determined based on the FEC selection data table 115. Here, a port for inputting information to the optical communication card from outside is defined as an input side, and a port for outputting information to outside is defined as an output side. Further, transmission speed information corresponding to the optical communication card 10 included in product information transmitted to the control card 105 from the control unit 104 can be input to the data retrieval processing unit 114 for determining the transmission speed. Further, the transmission speed and the transmission line for a main signal connected to two different unconnected ports can be automatically input, by determining from information on the accommodation signal processing unit 107 corresponding thereto respectively and selecting connection ports so as to connect via the same protocols (Ethernet, etc.) to select the transmission line.

The control card transmits, to the control unit 104 of the optical communication card, a control signal including the selected FEC function information. The control unit 104 inputs, to the function selection unit 111 of the main signal processing unit 103, a selection instruction of the FEC function based on the FEC function information in the control signals. As a result, the function selection unit 111 controls a selector of the FEC processing function unit 110 to select an appropriate FEC function from among multiple types of FEC functions of the FEC processing unit 110 and to perform an appropriate FEC processing for the main signal.

Further, by always monitoring an error rate detected by the FEC function unit 110 relating to the FEC function, the FEC function to be used may also be selected based on the error rate during the operation.

Figure 2:
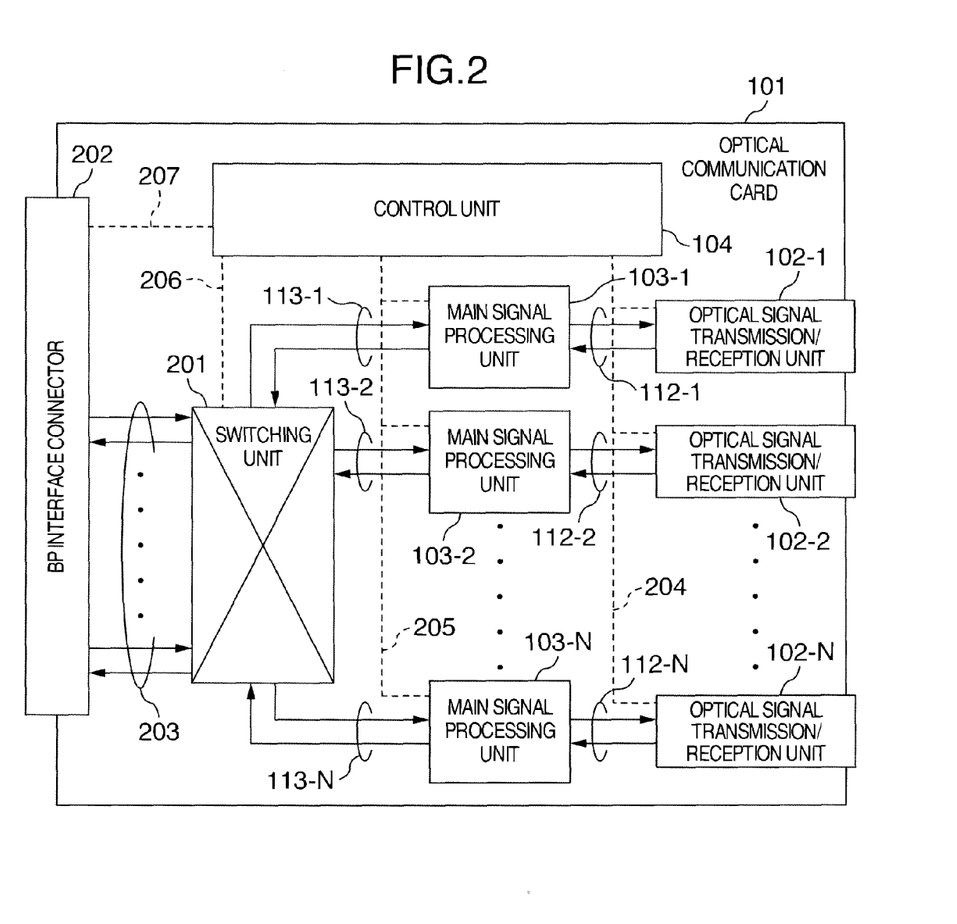
FIG. 2 illustrates a configuration of the optical communication card.

FIG. 2 illustrates a configuration of the optical communication card. The optical communication card 101 has the multiple optical signal transmission/reception units 102, the multiple main signal processing units 103, an optical communication card switching unit 201 capable of selecting a path of a main signal in the card, and a backplane (hereinafter, referred to as "BP") interface connector 202 that communicates with other cards. The optical communication card 101 can transmit a main signal between two arbitrary ports, and transmit/receive a main signal to/from other optical communication cards (not shown) mounted on the optical transmission device via the BP interface. Each card 101 comprises main signal transmission lines 112, 113, and 203 for the outside, the inside of the card, and the BP as transmission lines for propagating a main signal between respective function units. The main signal propagates through the main signal transmission line. Further, the card 101 comprises control signal transmission lines 204, 205, 206, and 207 for propagating control signals to perform function setting and alarm/monitoring of each function unit.

Figure 3:
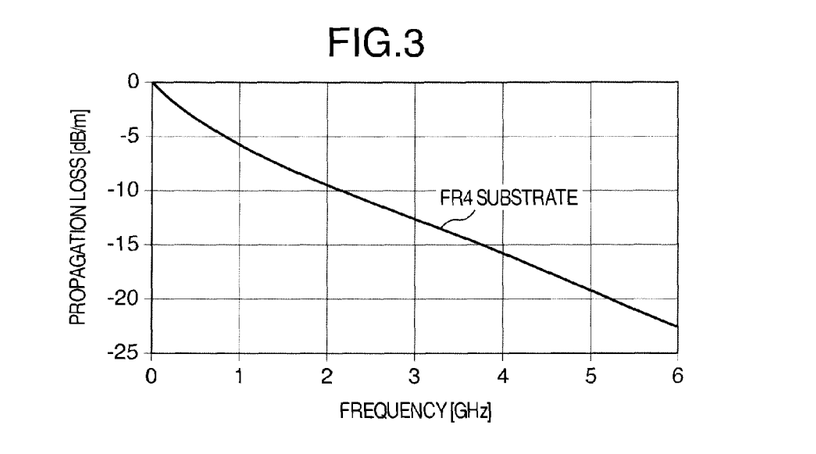
FIG. 3 illustrates propagation loss versus signal frequency.

Here, in FIG. 3, propagation loss versus signal frequency is illustrated. FIG. 3 illustrates, as one example, the propagation loss versus the signal frequency at the time of using an FR4 substrate (general flame-resistant glass epoxy substrate). The horizontal axis represents the signal frequency, and the vertical axis represents the propagation loss per meter. As the signal frequency increases, an attenuation amount of the signal propagating through the substrate increases. Since the signal frequency means the transmission speed in the device, a signal attenuation amount per unit distance becomes larger along with an increase in the transmission speed and a bit error rate increases. Further, as the propagation distance becomes longer, the attenuation amount becomes larger, and therefore, the bit error rate increases as expected. Accordingly, each transmission speed and each transmission line having different characteristics including the propagation distance need to be considered as a parameter to select the FEC function.

As described also in the background of the invention, a throughput of the correction bits for each FEC function is different. Therefore, power consumption relating to one main signal is different. As a system capacity becomes larger, an effect of reducing power consumption of the FEC function in the device while securing transmission quality necessary for system requirements becomes larger.

Figure 4:
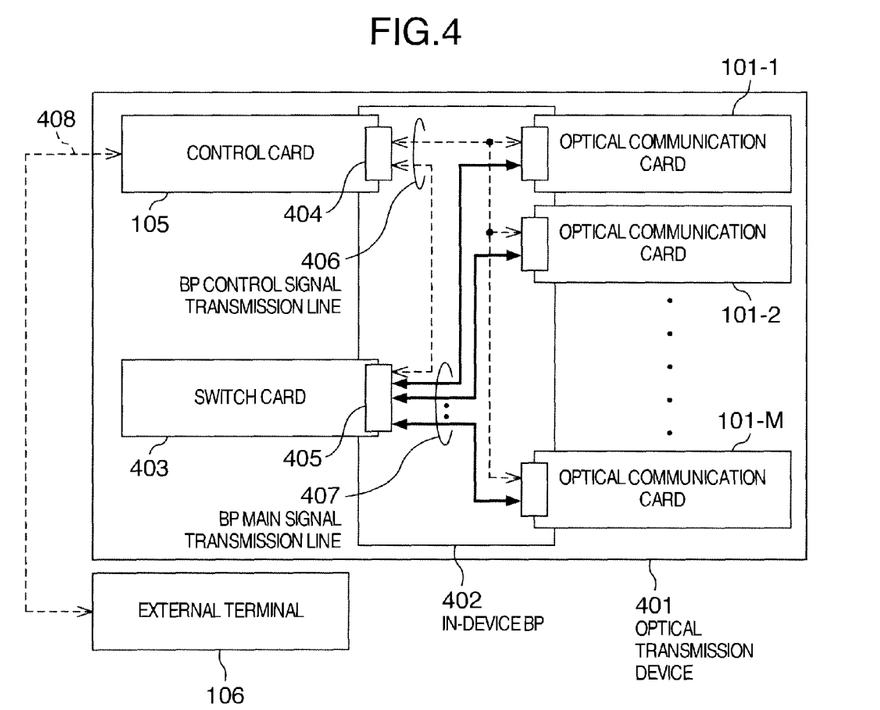
FIG. 4 illustrates a configuration of an optical transmission device.
Figure 5:
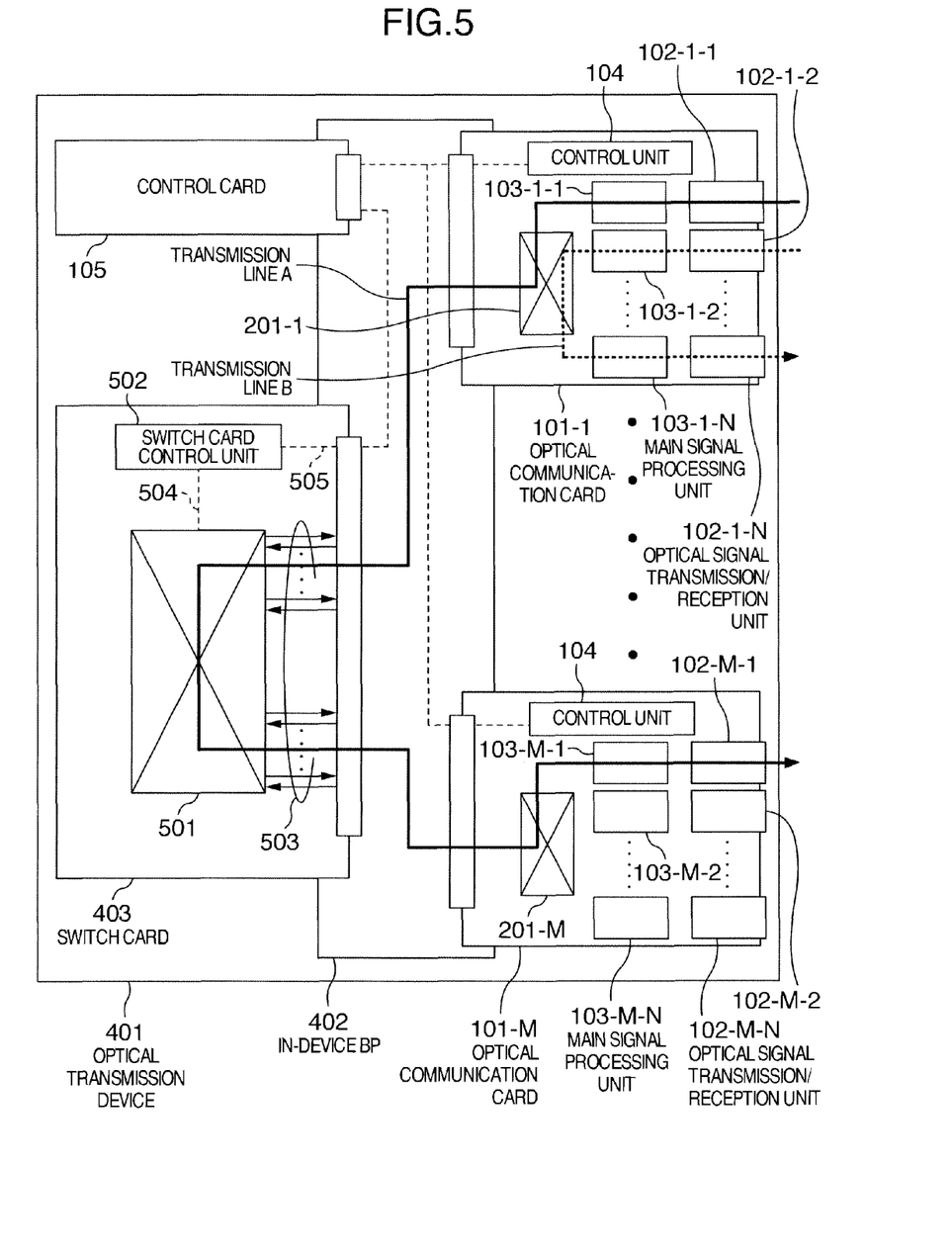
FIG. 5 illustrates the optical transmission device mounted with multiple optical communication cards and a switch card.

FIG. 4 illustrates a configuration example of the optical transmission device mounted with the optical communication cards and connected to an external terminal. The optical transmission device 401 has an in-device BP 402 that transmits main signals or control signals between various cards, and it can be mounted with the optical communication cards 101, the control card 105, and a switch card 403 for changing a main signal path from one card to another card in the device. The in-device BP 402 has a BP control signal transmission line 406 that propagates control signals between the control card 105 and each optical communication card, and a BP main signal transmission line 407 for propagating main signals between the optical communication cards 101 and the switch card 403. The control card 105 and the switch card 403 have a control card BP interface connector 404 and switch card BP interface connector 405 for transmitting/receiving signals to/from the in-device BP 402, respectively. From the external terminal 106 to a control signal transmission line for an external terminal 408 connected to the control card 105, the maintenance person can transmit control information on a transponder function for relaying signals or performing port setting to select a main signal path or an interface function via the switch card 403 to thereby select a configuration of the optical transmission device 401. FIG. 5 illustrates a configuration example of the state where main signal are transmitted among the multiple optical communication cards in the optical transmission device mounted with the switch card and the optical communication cards. The switch card 403 comprises a switch card switching unit 501 (large-capacity switching unit) capable of changing paths of a large amount of main signals from the multiple optical communication cards, a control unit 502 that controls the large-capacity switching unit 501, a main signal transmission line 503 for propagating the main signal, and control signal transmission lines 504 and 505 for propagating a control signal.

For example, when the maintenance person performs two path settings so as to connect both of the ports to transmit one optical signal over a network from the optical signal transmission/reception unit 102-1-1 to the optical signal transmission/reception unit 102-M-1 and another optical signal over a network from 101-1-2 to 102-1-N, transmission lines A and B are selected, respectively.

Figure 6:
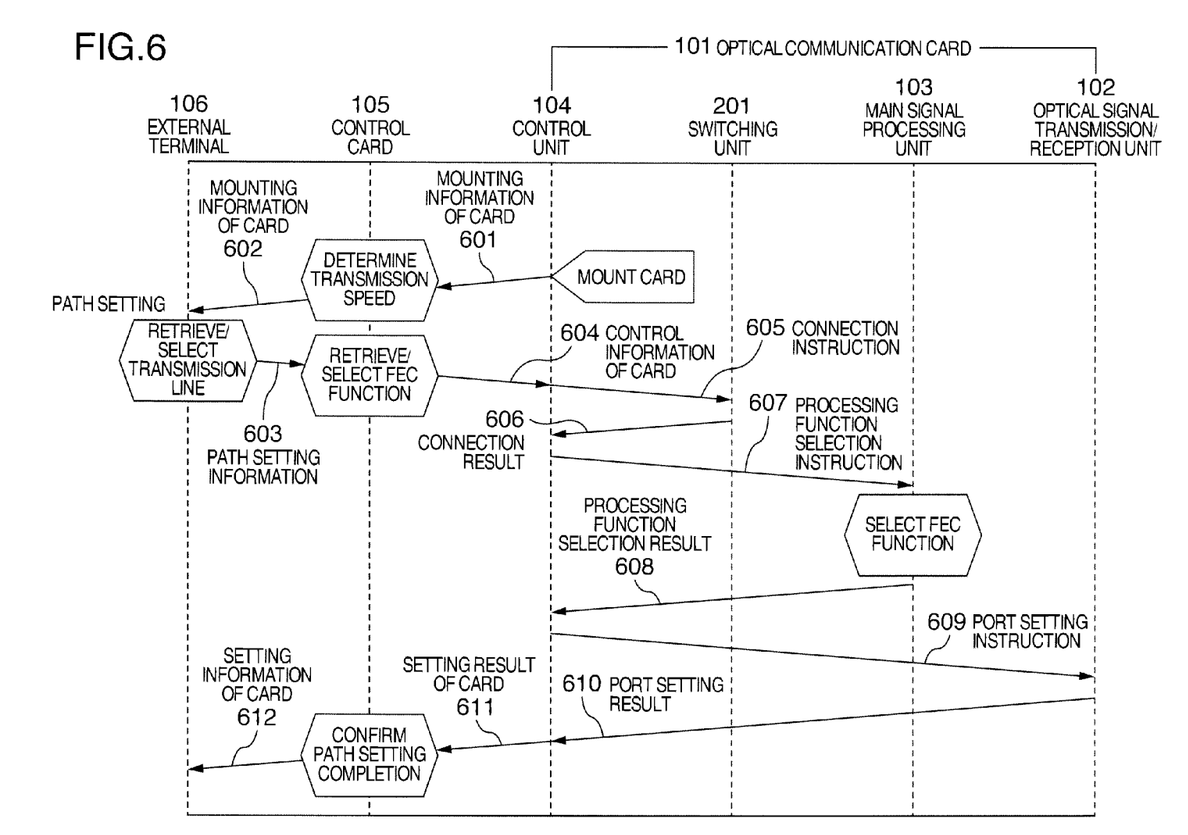
FIG. 6 illustrates a main signal processing control sequence in the optical communication card.

FIG. 6 illustrates a main signal processing control sequence by means of path setting according to the present embodiment. When the optical communication card is mounted on the optical transmission device, mounting information 601 including a product code indicating a card type and manufacturing date, etc., and when the transmission speed depends on the individual card, product information such as a transmission speed corresponding to the card is transmitted from the control unit 104 of the optical communication card to the control card 105. When the transmission speed depends on the individual card, it can be determined at this step, and FIG. 6 illustrates a case where the transmission speed depends on the individual card. By transmitting the mounting information 602 from the control card 105 to the external terminal 106, the maintenance person can confirm the mounting information on the mounted card. Here, when the multiple optical communication cards and the switch card are mounted on the optical transmission device, the mounting information on all of the cards may be transmitted to the control card 105. When the maintenance person performs path setting of a main signal from the external terminal 106 based on the information, the external terminal 106 retrieves and selects a transmission line corresponding to a path, and gives path setting information 603 including the determined transmission line information to the control card 105 as illustrated in FIG. 1. As illustrated in FIG. 1, the control card 105 holds as a data table the FEC function information necessary for the transmission speed and the transmission line. The control card 105 retrieves and selects the relevant FEC function information based on the mounting information 601 including transmission speed information and the path setting information 603 including transmission line information. Further, the control card 105 transmits control information 604 including FEC function selection information to the control unit 104 of the optical communication card 101. Then, for establishing a connection configuration between the arbitrary main signal processing units 103 of an optical communication card, or between the main signal processing unit 103 and the BP interface connector 106, the control unit 104 of the optical communication card transmits a connection instruction 605 to the switching unit 201. When confirming a connection result 606, the control unit 104 then transmits a processing function selection instruction 607 including the selected FEC function information to the main signal processing unit 103. Setting including a selection of the necessary FEC function is performed by the main signal processing unit 103 based on the processing function selection instruction 607, and then the main signal processing unit 103 sends back a processing function selection result 608 to the control unit 104. The control unit 104 confirms the main signal processing function to transmit to the optical signal transmission/reception unit 102 a port setting instruction 609 to enable the optical signal transmission/reception unit 102. The control unit 104 receives a port setting result 610 to transmit a final setting result 611 of the optical communication card 101 to the control card 105 therefrom, and further the control card 105 transmits setting information 612 of the optical communication card to the external terminal 106. As described above, a configuration requested by the maintenance person can be established, and further a configuration of the optical transmission device 401 can be confirmed. When the multiple optical communication cards and the switch card are mounted, the control card 105 may transmit the card setting information 612 after confirming that setting of each optical communication card has been completed.

Figure 7:
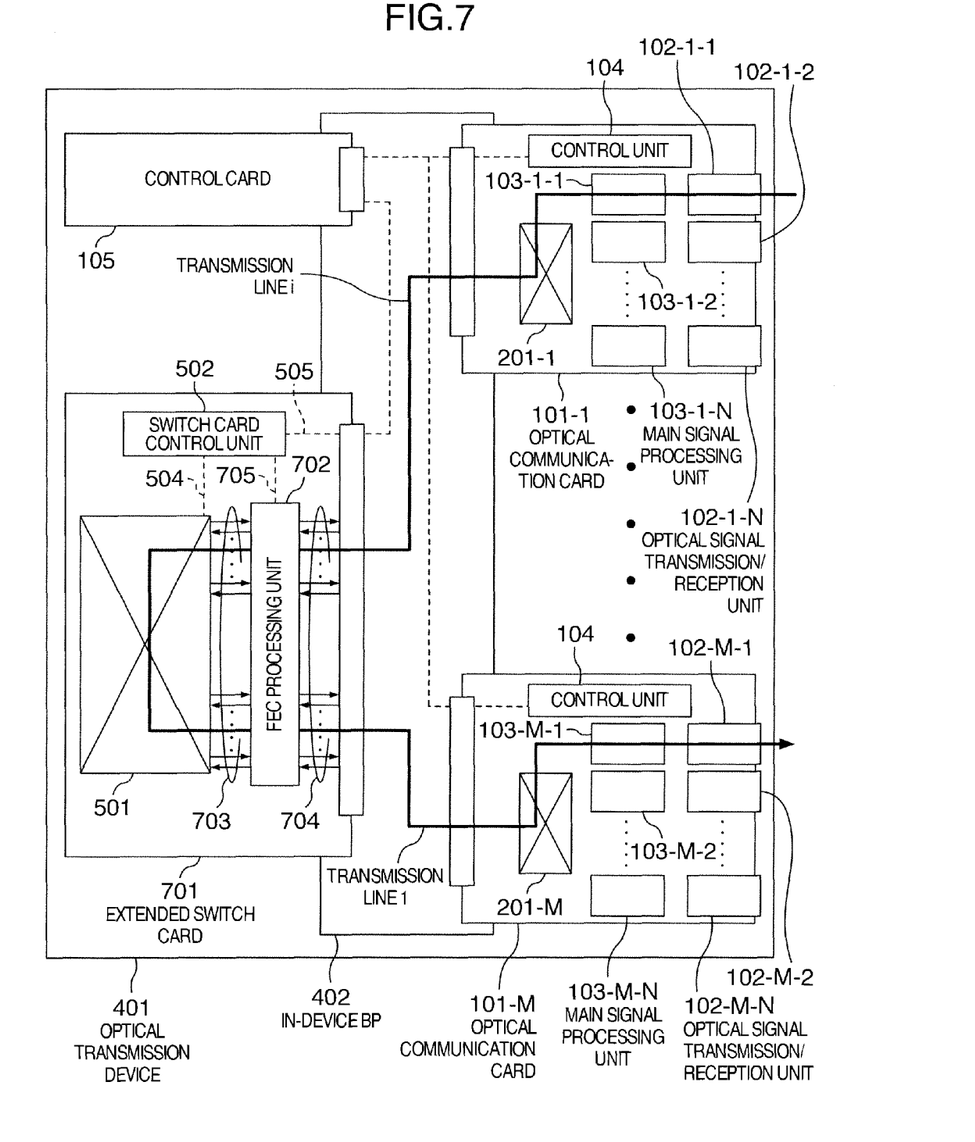
FIG. 7 illustrates a configuration of the optical transmission device mounted with an extended switch card and the optical communication cards.

FIG. 7 illustrates an embodiment of a configuration in which the optical communication cards, the control card, and the extended switch card are mounted on the optical transmission device. The extended switch card 701 illustrated in FIG. 7 comprises an extended switch card FEC processing unit 702. When the device is made larger using a long distance transmission of BP to increase the capacity by speeding up electrical signal transmission speed to 10 Gbps or more or increasing the number of ports to be accommodated in the device, the long distance transmission of BP increases propagation loss from one optical communication card to another optical communication card via the switch card and a bit error rate increases, and as a result, worsens transmission quality. In the present embodiment, by mounting the FEC function on the switch card, an error correction can be performed once for main signals between one optical communication card and the switch card. The error correction can be performed for main signals also from the switch card to another optical communication cards. Further, in the present embodiment, the extended switch card 701 comprises main signal transmission lines 703 and 704 for transmitting main signals in the extended switch card, and an extended switch card control transmission line 705 for transmitting control information including information for selecting the FEC function from the control unit 502 to the FEC processing unit 702. As a result, for example, in the case where it is desired that a main signal over the network is transmitted from the port 102-1-1 of the optical communication card 101-1 to the port 102-M-1 of the optical communication card 101-M via the extended switch card 701, a transmission line for transmitting the main signal in the device which an FEC is to be functioned for is divided into transmission lines "i" and "1" illustrated in FIG. 7.

Figure 8:
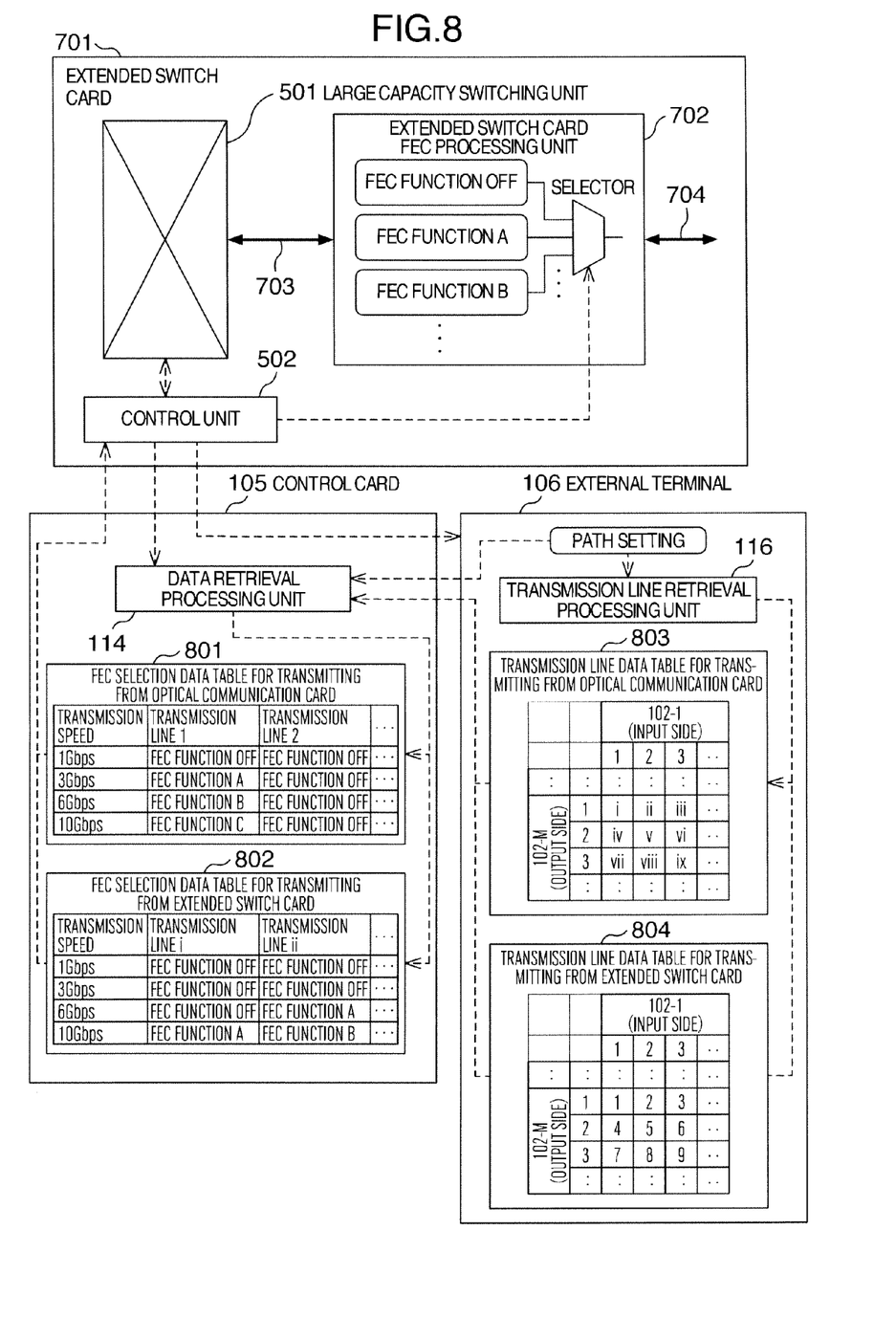
FIG. 8 illustrates the extended switch card focusing on a configuration of an FEC processing unit.

FIG. 8 illustrates a configuration example of the present embodiment of FIG. 7 focusing on the FEC function selection of the extended switch card, the control card, and the external terminal. Here, the data retrieval processing unit 114 and the transmission line retrieval processing unit 116 retrieve data in the same manner as in those in FIG. 1, respectively. In this embodiment, the FEC processing unit for performing an error correction to a main signal in the device is mounted on the optical communication card 101 and the extended switch card 701. As illustrated in FIG. 8, the control card and the external terminal hold tables (a FEC selection data table for transmitting from an optical communication card 801 and a transmission line data table for transmitting from an optical communication card 803) on the transmission line "i" in the direction from the optical communication card 101-1 to the extended switch card 701 and tables (a FEC selection data table for transmitting from an extended switch card 802 and a transmission line data table for transmitting from an extended switch card 804) on the transmission line "1" in the direction from the extended switch card 701 to the optical communication card 101-M, respectively. As a result, in the same manner as in the embodiment of FIG. 1, the FEC processing unit can select the FEC function necessary for an error rate required by system specifications with respect to each of main signals between the optical communication cards 101 and the extended switch card 701. By transmitting the control signal including the FEC function selected by the control card to the extended switch card and the optical communication cards, the different FEC processing can be performed for main signals of the transmission lines "i" and "1" in the FEC processing units of the cards, respectively. In the present embodiment, a configuration in which the FEC function is not used between the large-capacity switching unit 501 and the FEC processing unit 702. However, by holding a transmission line data table on the transmission line between the units 501 and 702 and a necessary FEC function selection data table in the control card 105 and the external terminal 106, the FEC processing can also be performed for main signals by the same process as in the above description.

Figure 9:
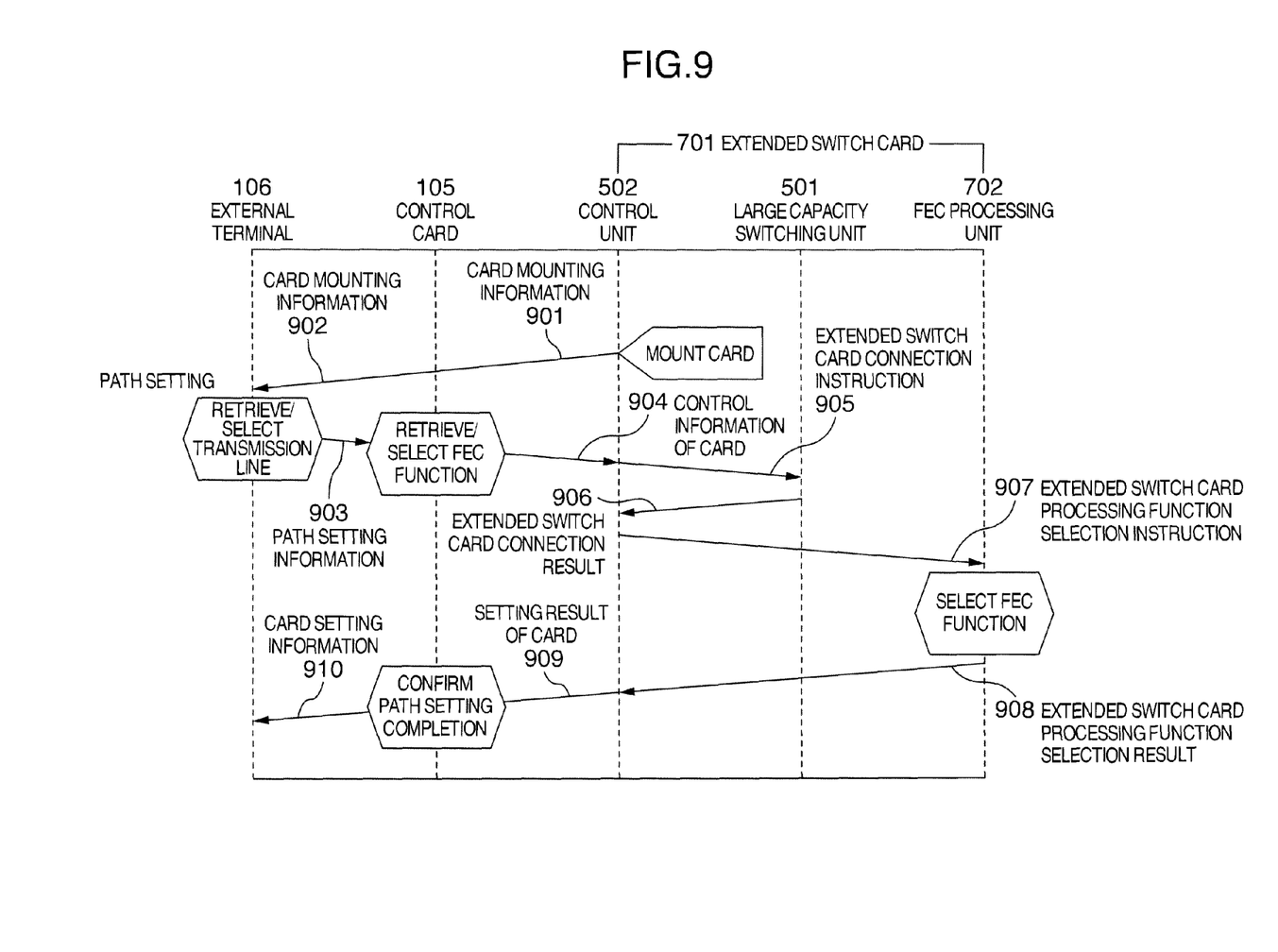
FIG. 9 illustrates a control sequence from path setting to main signal processing for the extended switch card.

FIG. 9 illustrates a main signal processing control sequence of the extended switch card according to the present embodiment. When the extended switch card is mounted on the optical transmission device, mounting information 901 including a card type, a product code, and product information that the extended switch card includes the FEC processing unit, etc, is transmitted from the control unit 502 of the extended switch card to the control card 105. When recognizing the mounting information 901, the control card 105 selects 801 and 802 as FEC selection data tables, and the external terminal 106 selects 803 and 804 as transmission line data tables. In addition, the main signal processing control sequence of the optical communication card that transmits/receives a main signal over the network can be fundamentally configured in the same manner as in FIG. 6. Accordingly, the transmission speed is determined from the mounting information 601 of the optical communication card.

By transmitting the mounting information 902 from the control card 105 to the external terminal 106, the maintenance person can confirm the mounting information of the mounted extended switch card 701. In the same manner as in FIG. 6, when the multiple optical communication cards are mounted on the optical transmission device, the mounting information on all of the cards may be transmitted to the control card 105. When the maintenance person performs path setting of the main signal from the external terminal 106 based on the information, as illustrated in FIG. 8, the external terminal 106 uses the transmission line data tables on the transmission lines from the optical communication card to the extended switch card and from the extended switch card to the optical communication card, retrieves and selects a transmission line corresponding to the path, and gives path setting information 903 including the determined transmission line information to the control card 105. Here, as illustrated in FIG. 8, the control card 105 holds as a data table the FEC function information necessary for the transmission speeds and the transmission lines from the optical communication card to the extended switch card and from the extended switch card to the optical communication card. Further, the control card 105 retrieves and selects the relevant FEC function information based on the mounting information 601 of the optical communication card including transmission speed information and the path setting information 903 including transmission line information. Then, the control card 105 transmits the control information 904 including FEC function selection information to the control unit 502 of the extended switch card 701 (and to the control unit 104 of the optical communication card 101 that transmits the main signal).

In addition, FIG. 9 illustrates a relationship among the extended switch card, the control card, and the external terminal. The path setting information 903 and the control information 904 may also include information on not only the path setting and control of the extended switch card, but also the path setting and control of both the extended switch card and the optical communication card that transmits the main signal via the extended switch card. When including information on both the extended switch card and the optical communication card, the path setting information 903 and the control information 904 may also be transmitted from the control card to both the control unit 502 of the extended switch card and the control unit 104 of the optical communication card. In the extended switch card 701, the control unit 502 of transmits a connection instruction 905 of the large-capacity switching unit 501. When confirming a connection result 906, the control unit 502 then transmits a signal processing function selection instruction 907 including the selected FEC function information to the extended switch card FEC processing unit 702. Setting including the necessary FEC function is here performed, and then the FEC processing unit 702 sends back a processing function selection result 908 to the control unit 502. The control unit 502 confirms the main signal processing function to send back a final setting result 909 of the extended switch card 701 to the control card 105 therefrom. Further, by transmitting setting information 910 of the card from the control card 105 to the external terminal 106, the maintenance person can confirm a configuration of the optical transmission device 401.

In addition, when adopting, as a back panel in the future high-speed signal transmission exceeding 10 Gbps, an optical backplane using an optical fiber and optical waveguide that transmit an optical signal in place of an electrical signal, the present invention can be similarly applied by performing the FEC processing for an electrical signal, converting it into an optical signal, transmitting it to an optical BP, converting an optical signal into an electrical signal after the optical signal has passed through the optical BP, and performing an error detection and correction. In such a case, an optical-electrical signal conversion unit that performs conversion between an electrical signal and an optical signal needs to be included at the pre-stage of the BP interface connector that transmits/receives a main signal to/from the BP.

In the above embodiment, the optical transmission device comprises the switch card, but the switch card may be omitted when the number of optical communication cards to be mounted on the device is one.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An optical transmission device comprising:
multiple optical communication cards;
a control card configured to control the optical communication cards; and
a switch card connected to the multiple optical communication cards, wherein
each of the optical communication cards comprises:
  a signal transmission/reception unit configured to perform optical-electrical signal conversion for a signal received from outside;
  a first FEC processing unit configured to perform FEC processing for a signal from the signal transmission/reception unit;
  a first function selection unit configured to select a type of the FEC processing and to control the first FEC processing unit; and
  a first control unit configured to transmit/receive a signal to/from the control card,
the switch card comprises:
  a second FEC processing unit configured to perform FEC processing for a signal from one of the optical communication cards; and
  a second control unit configured to select a type of the FEC processing and to control the second FEC processing unit and configured to transmit/receive a signal to/from the control card, and
the control card comprises:
  a data table that associates a transmission line with multiple different types of FEC functions applicable to the transmission line and that stores them; and
  a retrieval processing unit configured to retrieve information to be transmitted to at least one of the first control unit and the second control unit from the data table.

2. The optical transmission device according to claim 1, wherein:
the first FEC processing unit is configured to store multiple different types of FEC functions; and
the first function selection unit is configured to select one of the multiple different types of FEC functions.

3. The optical transmission device according to claim 1, wherein:
the retrieval processing unit is configured to retrieve an FEC function corresponding to the transmission line and transmission speed corresponding to path setting information received from outside; and
the first control unit is configured to control the first selection unit based on a retrieval result of the FEC function by the retrieval processing unit received from the control card.

4. The optical transmission device according to claim 3, wherein the control card is configured to transmit first mounting information received from the one of the optical communication cards to outside, and to receive the path setting information determined based on the first mounting information from outside.

5. The optical transmission device according to claim 3, wherein the control card is configured to transmit second mounting information received from the switch card to outside, and to receive the path setting information determined based on the second mounting information from outside.

* * * * *